United States Patent [19]

Wolf et al.

[11] Patent Number: 4,833,655

[45] Date of Patent: May 23, 1989

[54] FIFO MEMORY WITH DECREASED FALL-THROUGH DELAY

[75] Inventors: Michael A. Wolf, Northboro; Jeffrey M. Bessolo, Groton, both of Mass.

[73] Assignee: Wang Laboratories, Inc., Lowell, Mass.

[21] Appl. No.: 750,723

[22] Filed: Jun. 28, 1985

[51] Int. Cl.$^4$ .............................................. G11C 7/00
[52] U.S. Cl. .................................. 365/221; 365/73; 365/230.05; 377/67; 371/49
[58] Field of Search .................. 365/221, 78, 189, 73, 365/230; 377/67, 77, 78, 79, 80, 81

[56] References Cited

U.S. PATENT DOCUMENTS

| | | | |
|---|---|---|---|
| 4,058,773 | 11/1977 | Clark et al. | 377/81 |
| 4,151,609 | 4/1979 | Moss | 365/221 |
| 4,156,288 | 5/1979 | Spandorfer | 365/78 |
| 4,296,477 | 10/1981 | Hutson | 365/78 |
| 4,592,019 | 5/1986 | Huang et al. | 365/189 |
| 4,642,797 | 2/1987 | Hoberman | 365/221 |

Primary Examiner—Stuart N. Hecker
Assistant Examiner—Glenn A. Gossage
Attorney, Agent, or Firm—Michael H. Shanahan; Kenneth L. Milik

[57] ABSTRACT

A first-in, first out data memory minimizes fall-through delay. The FIFO memory has a plurality of cascaded register stages arranged in sections, with the input of each section selectively coupled to a bypass bus. Data is introduced on the bypass bus, and control logic writes the data into the section nearest the output which is currently not full. The individual register stages are self-clocked, so that data is then shifted toward the output through any vacant registers. In another aspect, the register stages are arranged in sections of different length, with the shortes section closest to the output and the longest section closest to the input. Decreased fall-through delay is achieved by minimizing the length of the FIFO buffer actually traversed by the data while insuring that the order of the data remains unchanged.

10 Claims, 5 Drawing Sheets

FIFO MEMORY WITH DECREASED FALL-THROUGH DELAY

BACKGROUND OF THE INVENTION

1. Field of the Invention

This invention relates to FIFO (First-in/First-out) memories and more particularly relates to an improved FIFO serial shift-register memory which operates with decreased fall-through delay.

2. Description of Related Art

FIFO memories are widely used as intermediate buffers where there is a need to transfer binary data between systems or devices which operate at different frequencies and where the order of the data must remain unchanged. These devices are often constructed of multiple shift-register stages coupled for cascade operation. Data is clocked into the first shift register stage at some shift-in frequency, and after a certain latency time or fall-through delay, the data is clocked out of the last stage at a different shift-out frequency. The fall-through delay is the time it takes from data to propagate through the FIFO, from input to output.

It is desirable for a FIFO to have large storage capacity, or length, sufficient to hold an entire block of data from a slower data-handling device to a much faster one. However, where the capacity of the FIFO is large, typically 256 bytes, the fall-through delay becomes long, particularly when the FIFO is empty and new data is entered into it, negatively affecting performance and placing unwanted constraints on system design.

In the prior art, efforts to deal with the problems of FIFOs have been varied but only marginally effective. One approach has been to design FIFO buffers using random access memories. A device of this type is the MK4501 FIFO manufactured by Mostek, Inc. of Carrollton, Tex. In general, RAM-type FIFOs can buffer large blocks of data and recall the data quickly. However, in order to read from and write to the FIFO simultaneously, the RAM must be dual-ported or have sufficient control logic to simulate dual port operation. In addition, complex circuitry must be employed to keep track of the data locations in the RAM. The additional counter and control circuitry increases the complexity of the device and slows down the rate at which data can be accessed.

U.S. Pat. No. 4,314,361 to Jansen et al. discloses another FIFO memory device of the shift register type, having a single, fixed input and a variable output. In this patent, each memory stage is connected to an output bus and logic circuitry selects the stage from which data is extracted from the buffer. This device has reduced fall-through delay, since data need not travel through the entire FIFO; however, to buffer large blocks of data, it cannot easily be constructed in integrated circuit form, which would be highly desirable. Each memory stage requires independent transistors for driving an output bus, and the involved wiring, complexity, increased chip area, and the high-power dissipation problems would render such a device impractical. There is a need for a FIFO which is designed so as to minimize the fall-through delay, yet be simple and cost effective, while also lending itself to manufacture as an integrated circuit.

SUMMARY OF THE INVENTION

The present invention seeks to avoid the limitations and drawbacks of prior art FIFO memories.

Accordingly, a primary object of the present invention is to provide a FIFO data memory which can buffer full blocks of data with very fast fall-through time and with shift-in and shift-out rates that are faster than in most RAM-based FIFOs.

It is a further object of the present invention to provide a FIFO data memory that is simple in design, without the complex decoder and arbitration logic required in RAM-based designs.

It is a still further object of the present invention to provide a FIFO data memory which can buffer full blocks of data and still be implemented using integrated circuit techniques.

The foregoing and other objects are achieved in the present invention of a FIFO data memory which provides reduced fall-through delay and simple design. According to the present invention, a FIFO data memory comprises a plurality of shift register stages, or memory cells coupled for cascade operation. The shift register stages are sequentially arranged in sections. Each of these register sections has an associated input and output. Further, each register section is made up of a different number of register stages and can therefore be said to have a different length. The first section, closest to the input of the FIFO, has the longest length and successive sections have decreasing length, with the last section, closest to the output, having the smallest length.

The length of each section is optimized in order to decrease the fall-through delay through the buffer while ensuring a non-interrupted data stream, and these optimum section lengths are a function of the minimum required delay time, the bubble and shift time for each individual stage, the maximum allowed input and output clock rate, and the desired length of the FIFO data memory.

The shift register sections and the internal shift register stages are coupled output-to-input, so that data entering the input of the first stage will be shifted down the line, from stage-to-stage, until it reaches the output of the last stage in the last section.

Further, a bypass bus is selectively coupled to the input terminal of each register section, through which data pulses are introduced. Incoming data will internally bypass the FIFO register sections which are empty of data and enter the register section that is not full and closest to the output. In the case of an empty FIFO, this register section is also the empty section which is shortest in length.

Each register stage has status & control logic to initiate self-clocking, so that data will be shifted toward the output of the data memory. The status means detects the occurrence of an empty data condition for that stage and a full data condition for the preceding stage. When both conditions are detected, control logic within each memory stage initiates a self-clocking operation, and the data from the preceding stage is shifted to the present empty stage. Data will continue to shift by this process, stage-by-stage, until the status means for the stage then containing that data detects a full data condition for its own stage and the preceding one. By this self-clocking process, data entered at the left of the FIFO memory shifts to the right automatically, and is completely asynchronous from the external shift-in clock.

Further, status means is coupled to each register section for indicating either a full data condition or an empty condition of that section. Control logic means is coupled to each register section and is responsive to said status means for selecting which of said register sections is to receive data from the bypass bus. The control logic is designed such that data is always written into the register section that is not full and nearest the output stage of said data memory to decrease fall-through delay time.

The input and output stages have independent clock inputs, which are controlled by the sending subsystem and the receiving subsystem, respectively. The clock inputs control the rate at which data is written to or read from the FIFO memory. Data transfer is thus fully asynchronous, in that data can be written into the FIFO memory by a sending subsystem at the same time data is read out of the FIFO memory by a receiving subsystem.

The FIFO is a simple design consisting of a shift register, a bypass bus, and control circuitry. Because connections to the bypass bus occur only at the section level, rather than at the register stage level, driver and interconnect circuitry is minimized, allowing for practical implementation as an integrated circuit, with minimal power dissipation problems. The resulting FIFO data memory can operate at high clock rates with minimal fall through delay. The FIFO register internal self-clock rate can be very fast, limited only by the propagation delay of the circuitry used, which is dependent on the semiconductor technology used for an IC implementation. The foregoing and other objectives, features, aspects, and advantages of the present invention may be more fully appreciated by considering the following detailed description and claims.

DESCRIPTION OF THE PREFERRED EMBODIMENTS

Figure 1:
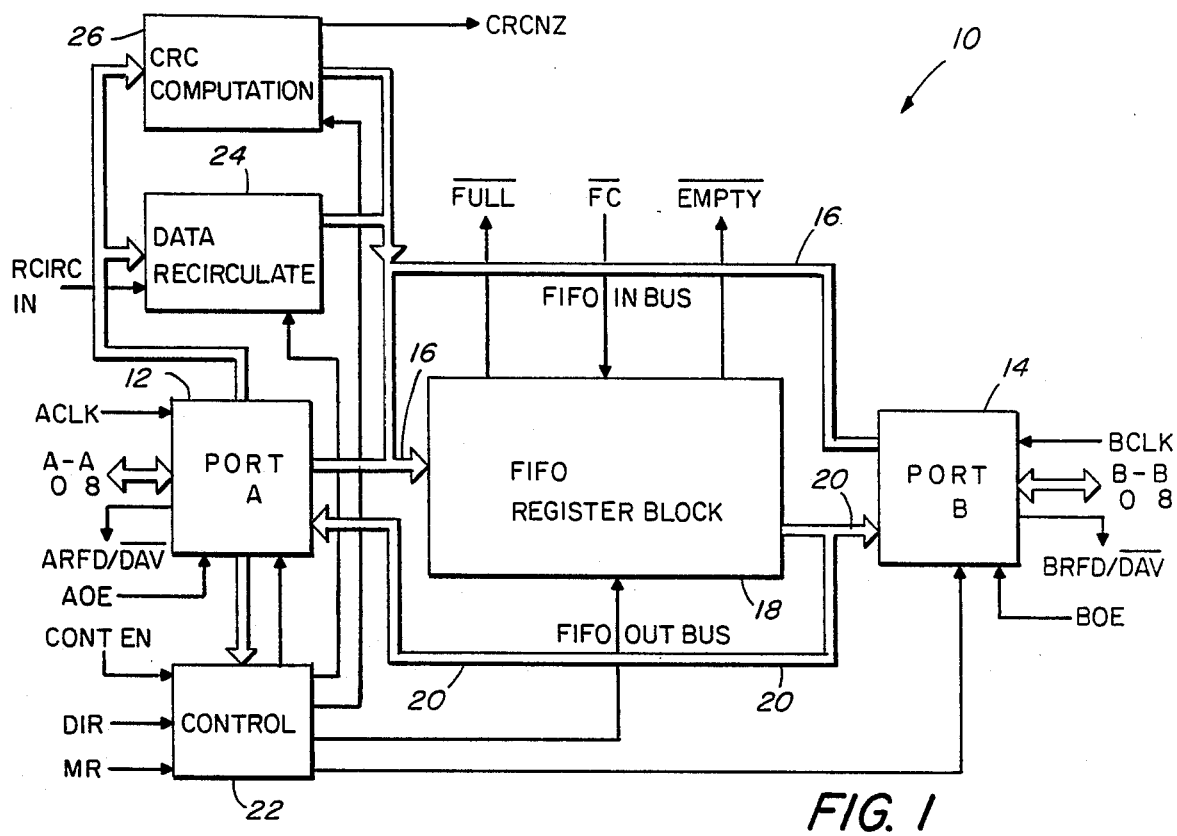
FIG. 1 is a functional block diagram of an entire FIFO memory of the present invention.

The FIFO of the present invention is shown in FIG. 1, generally designated as 10. In its preferred embodiment, the FIFO can buffer data blocks ranging up to 265 9-bit words, and it is particularly suitable for implementation as a large-scale integrated circuit using NMOS or CMOS technology. An important use of the FIFO would be as a fully asynchronous interface device between two subsystems which operate at different data rates and do not share a common clock, for example, a computer memory and a slower peripheral device, such as a printer.

The FIFO is bidirectional, for storing and transferring full blocks of data in either direction. This is made possible by the use of an input bus 16, output bus 20, and I/O ports 12 and 14 that use conventional three-state devices. Referring now to FIG. 1, the FIFO is shown to have six main blocks. Data $A_0$–$A_8$ enters FIFO 10 by Port A 12, or data $B_0$–$B_8$ enters by Port B 14, depending on the selected direction of the FIFO. Bidirectional data ports 12 and 14 have clock inputs ACLK and BCLK, respectively, for shifting in or shifting out data, to provide full asynchronous operation. Flag outputs ARFD/$\overline{\text{DAV}}$ and BRFD/$\overline{\text{DAV}}$ indicate the status of the first and last storage register stages of FIFO Register Block 18. Output enable inputs AOE and BOE are provided for three-state control of output buffers in the register block and will be described in more detail in what follows.

FIFO Input Bus 16 transfers data from either Port A 12 or Port B 14 to the input of the 265 word by 9 bit first-in/first-out Register Block 18. FIFO Register Block 18 comprises a number of shift register stages grouped into register sections of different lengths and a bypass bus 40 coupled to each register section. These important features of the present invention will be discussed in more detail in connection with FIG. 2. FIFO Output Bus 20 transfers output data from FIFO Register Block 18 to Port B 14 or Port A 12. The direction of FIFO operation is controlled by input DIR to the Control block 22.

Control block 22 provides means for controlling the programmable Data Recirculate block 24 and CRC Computation block 26. Control block 22 receives three input signals from the sending subsystem —MR (master reset), DIR (direction control), and CONT EN (control enable). Data Recirculate block 24 changes the FIFO into a large recirculating shift register on program command. CRC Computation block 26 provides conventional circuitry to compute cyclic redundancy check characters for the detection of bit errors.

Figure 2:
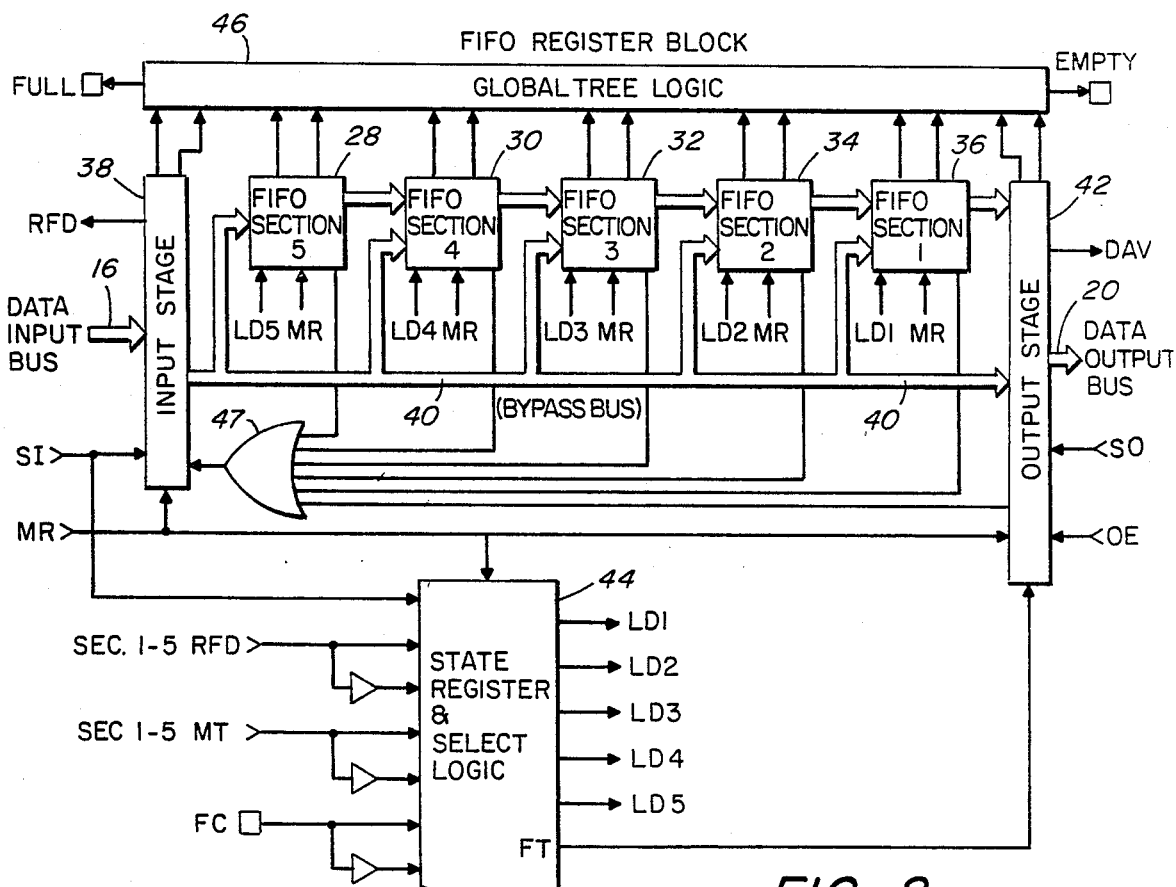
FIG. 2 is a detailed block diagram of the Register block of the present invention.

Turning now to FIG. 2, Register Block 18 is shown in more detail. There is shown an input stage 38 which receives data from FIFO Input Bus 16. There are five FIFO Register Sections 28, 30, 32, 34, and 36 of different lengths. Together, the register sections form a 265 word by 9 bit array. The makeup of an individual register section is shown in detail in FIG. 3 and will be described more fully further on.

Register Sections 28 through 36 are coupled for cascade operation, with the output of one section joined to the input of the next section, and so on down the line. Data presented to the input of register section 28 begins to ripple toward register stage 36.

In addition, each register section is capable of receiving data from Input Stage 38 through Bypass Bus 40. Data coming from FIFO Input Bus 16 is presented to Bypass Bus 40 and each register section is filled in sequence, starting with Register Section 36 and ending with Register Section 28.

Data is unloaded from the FIFO array through Output Stage 42, and as this occurs, data in previous register sections will ripple through each successive section toward Output Stage 42. Incoming data from Input stage 42 will always be routed behind existing stored data in the array to maintain the order of data.

The destination of incoming data is determined by the state of the FIFO array at any given time. Each of Register Sections 28 through 36 generates local RFD (ready for data) and MT (empty) flag output signals, which are presented to the State Register & Control Logic 44 along with an FC (Full Cascade) control input. The input signals to the State Register & Control Logic 44 are state variables used in determining which register section, if any, will receive the input data.

Upon a valid shift-in (SI) clock edge, the state of the array will be latched into State Register & Control Logic 44 as data is clocked into FIFO Input Stage 38. The output of the State Register & Control Logic 44 enables the appropriate register section via the signals LDn (Load Data) to accept data from Input Stage 38. The RFD (ready for data) flag to FIFO Input Bus 16 bus will be invalid while data is being transferred from the Input Stage 38 to one of Register Sections 28 through 36 or the Output Stage 42.

The RFD flag is controlled by the output of OR gate 47, the inputs of which originate as clock signals in Register Sections 28 through 36. The RFD flag goes inactive on every clock cycle; as long as RFD becomes active, the FIFO is not full.

A control input FC (full cascade) is provided to allow for extending the FIFO by cascading multiple devices in the depth direction. If the FC input is inactive for an empty FIFO buffer in an array of cascaded devices, then data will undergo a fall through (FT) from Input Stage 38 directly to Output Stage 42 to minimize overall fall-through time for the entire array. Global tree logic 46 is simply combinational logic to provide signals FULL and EMPTY to indicate the state of the FIFO Register Block as a whole. These signals result from the local FL (full) and MT (empty) status inputs from every Register Section.

The following logic equations define the states required to select one of Register Sections 28 through 36 or Output Stage 42 to accept data from the Input Stage 38 upon a valid shift-in clock edge, where LDn (Load Data) is the select signal for that section. Signal FT (fall-through) is for bypassing the entire array as described above. For the purpose of these equations, Register Sections 28 through 36 are designated 5 through 1, respectively, where 5 is closest to the input and 1 is closest to the output:

$LD1 = 1\,RFD \cdot 2\,MT \cdot (FC + 1\,\overline{MT})$ $LD2 = 2\,RFD \cdot 3\,MT \cdot (2\,\overline{MT} + 1\,\overline{RFD})$ $LD3 = 3\,RFD \cdot 4\,MT \cdot (3\,\overline{MT} + 2\,\overline{RFD})$ $LD4 = 4\,RFD \cdot 5\,MT \cdot (4\,\overline{MT} + 3\,\overline{RFD})$ $LD5 = 5\,RFD \cdot (5\,\overline{MT} + 4\,\overline{RFD})$ $FT = \overline{FC} \cdot 1\,MT$ Data can be unloaded from Output Stage 42 upon a valid shift-out (SO) clock edge. A control latch in Output Stage 42 will inhibit data from being shifted out whenever the output buffers are three-stated, just as a similar control latch in Input Stage 38 inhibits incoming data whenever the FIFO is full or reset.

The master reset control MR, coming from Control Block 22 of FIG. 1, is provided to reset the control logic in each internal register stage, which will invalidate all existing data in the array.

Figure 3:
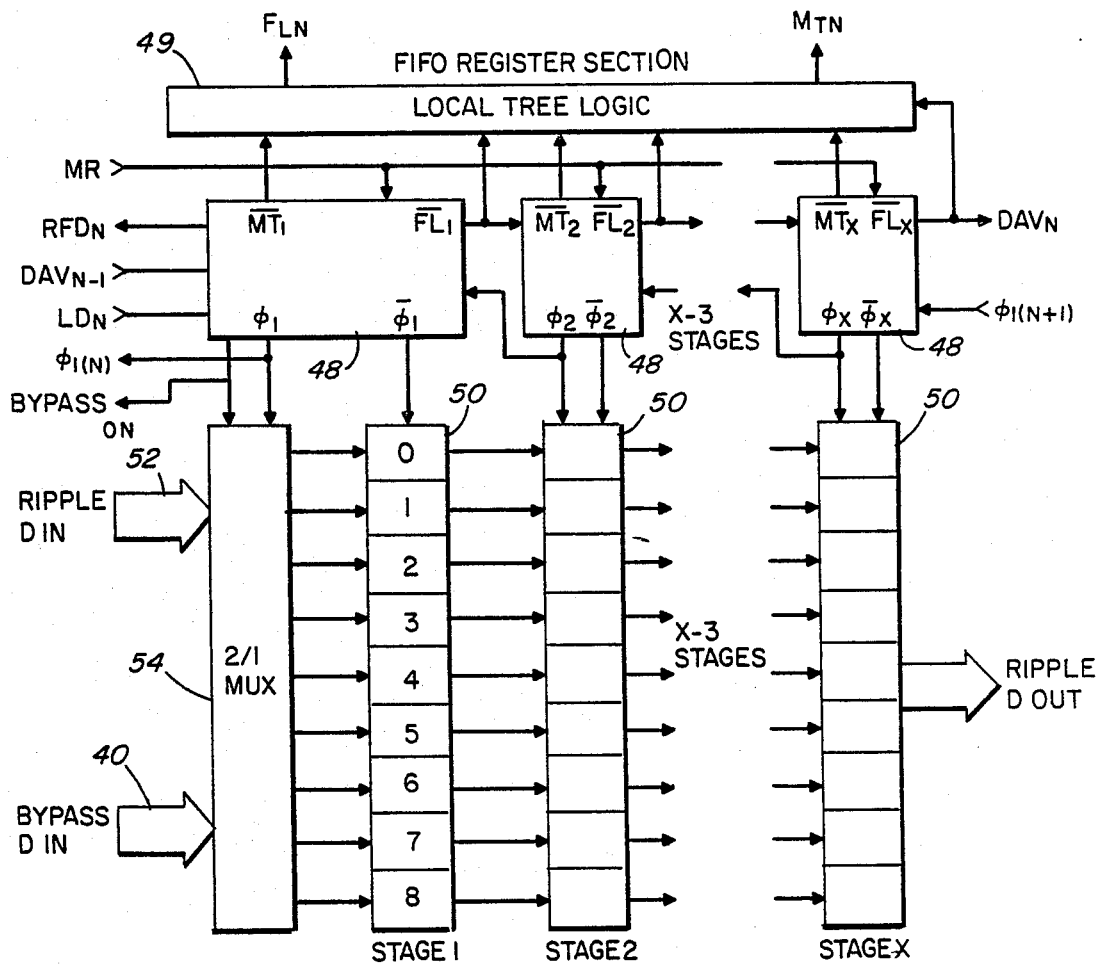
FIG. 3 is an functional illustration, showing the internal structure of one register section.

FIG. 3 illustrates the internal structure of any one of FIFO Register Sections 28 through 36. Each FIFO Register Section consists of a number of internal register stages and supporting control input logic. Each stage contains Control Logic 48 to clock a Data Word Register 50, consisting of nine D-type latches, designating bits 0 through 8. Control Logic 48 also stores a status marker bit $FL_x$, which goes active to indicate when its associated Data Word Register is full, or inactive to indicate when its associated Data Word Register is vacant. The marker bits allow Control Logic 48 to detect the status of the preceding Control Logic stage and communicate its own status to the succeeding Control Logic stage.

Local tree logic 49 is simply combinational logic to provide the FL and MT status signals for a register section as a whole; these outputs run to global tree logic 46.

Each Data Word Register 50 is self-clocked by its associated Control Logic 48. When Control Logic 48 indicates a vacant state in its own Data Word Register and at the same time detects a full state in the Data Word Register of preceding stage, it generates a clock pulse $\phi_x$ that transfers data from the preceding Data Word Register into its own Data Word Register, setting its own marker bit $FL_x$ to active as well as resetting the marker bit in the preceding Control Logic Stage 48 to inactive.

Data can be entered into any of Register Sections 28 through 36 either through a normal Ripple Input 52 path from the previous Register Section or from Bypass Bus 40 through Multiplexer 54, controlled by signal $LD_n$ (Load Data) which originates at State Register & Control Logic 44 of FIG. 2. As data is shifted out of the FIFO, all preceding data will automatically ripple toward the output end. Since all valid input data to a given Register Section will ripple through to the output stage, the status $FL_x$ of the last Control Logic stage indicates when the FIFO is ready to output data. Similarly, since all vacant positions bubble automatically to the input end, the status of the first Control Logic stage input section indicates when the FIFO is ready to accept data.

There are two parameters of the internal stages that are crucial to choosing the optimum length of the individual Register Sections. These parameters are based on the principle that a datum, upon being input to the FIFO, shifts consecutively through empty stages until it reaches the output or a successor stage that already contains data.

The time for a datum or "drop" of data to move from one register stage to the next consecutive stage is defined as $T_{drip}$, the "drip time." The time for a data vacancy or "bubble" to move from one register stage to the full stage preceding it is defined as $T_{bubble}$, the "bubble time." Generally speaking, $T_{drip}$ is usually slightly smaller than $T_{bubble}$, although conceptually they would appear to be equal. In the present embodiment $T_{drip}$ is 25 nanoseconds and $T_{bubble}$ is 28 nanoseconds due primarily to differences in gating paths for the circuit design and the semiconductor technology used.

Certain major parameters are dependent on the interaction of the sending subsystem and the receiving subsystem in order to achieve optimum performance. The global parameters of concern in choosing the optimum length of the Register Sections 28 through 36 are the desired fall-through time, $T_{fallthru}$, and the required minimum input or output shift time, $T_{shift}$.

Fall-through time should be as fast as possible for the particular system requirement, taking into account the required data block size. In the present embodiment, $T_{fallthru}$ was chosen to be 500 nanoseconds for a minimum data block size of 265 bytes.

The parameter $T_{shift}$ is important because the shift-in and shift-out clocks have speed limitations, i.e., data cannot be shifted into or out of the FIFO register block faster than the internal FIFO clock circuitry will operate. In the present embodiment $T_{shift}$ is 80 nanoseconds.

Data is shifted between the individual register stages at its own self-clocking rate, $T_{drip}$, which is always faster than $T_{shift}$. Therefore, data entering the FIFO will "catch up" with data already shifting through the FIFO, because the data moves internally faster than it can be shifted out.

It should also be noted the numbers given here for the present embodiment are worst case. The optimum number of stages ($N_1$) in Register Section 36, the section nearest the output, is simply:

$$N_1 = T_{fallthru} / T_{drip}$$

Note that $N_1$ is an integer, and must be rounded down to ensure that the actual fall-through time is at worst $T_{fallthru}$. Also, for the purpose of these equations, Register Sections 28 through 36 are designated 5 through 1, where 5 is the closest to the input and 1 is the closest to the output. For the preceding register sections the following equation should be applied:

$$N_j = (N_1 + \ldots + N_{(j-1)}) \times (T_{shift} - T_{bubble} - T_{drip}) / T_{drip}$$

The same note applies to $N_j$, that it must be rounded down to an integer. It is unlikely that an optimal set of FIFO Register lengths could be found with commercial components; however, in a custom IC, these equations can be used to design a FIFO having a series of Register Section lengths which are optimally-sized for the particular application of the FIFO. If register section lengths are non-optimal with respect to the particular application, a continuously shifted input data stream could result in an output data stream: with gaps of time because of delayed data. However, data integrity is independent of register section length; only the timing of the output data would be affected by the sectioning.

In the present embodiment, the optimum lengths of Register Sections 28 through 36 are 130, 69, 33, 16, 14, respectively, for a total of 262 registers. In addition, Input Stage 38 requires 2 registers for gating in of data, and Output Stage 42 requires one additional register for gating out data. The total length is therefore 265 bytes.

Figure 4:
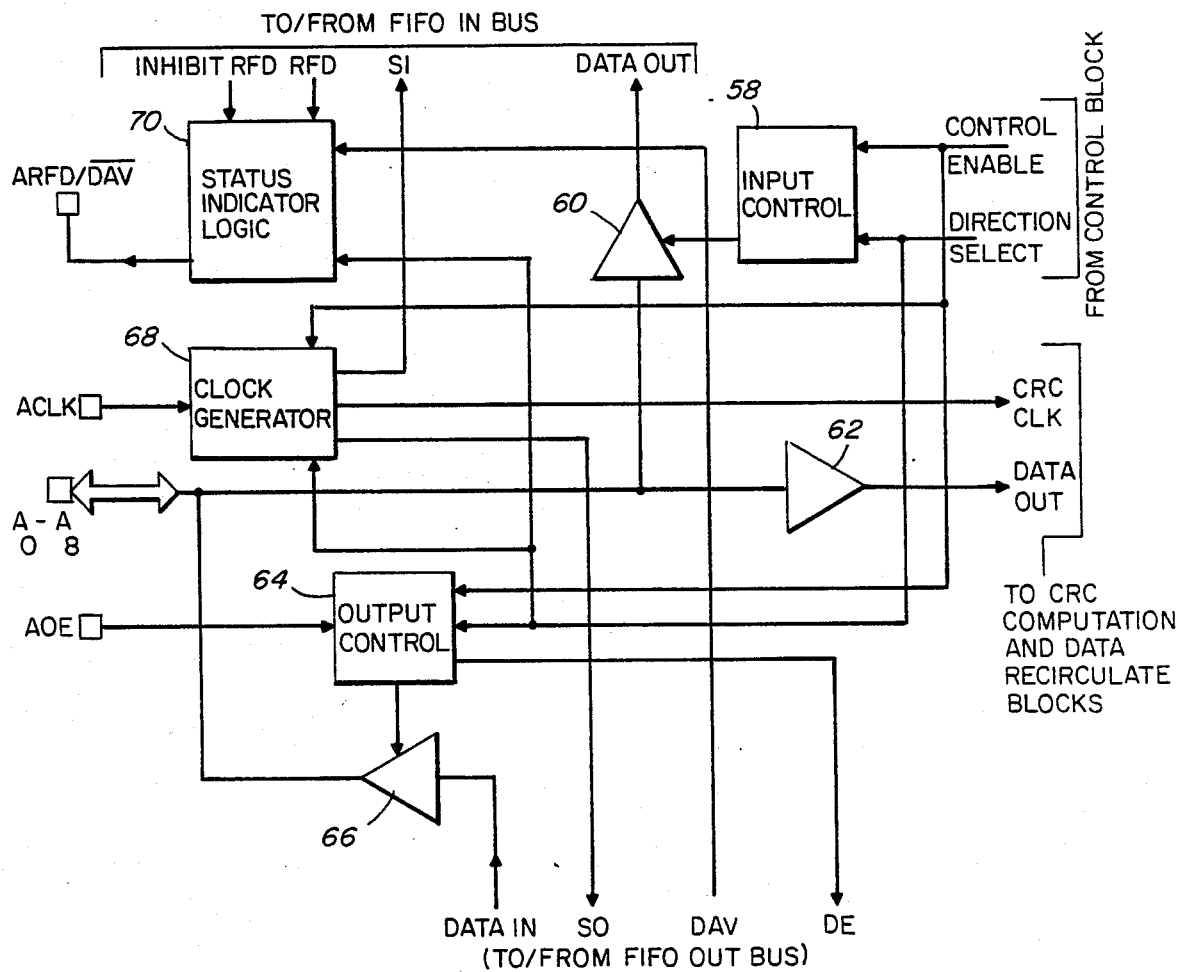
FIG. 4 is a block diagram of input/output Port A, showing further circuitry used to input and output data to the FIFO.

Turning now to FIG. 4, there is shown a more detailed block diagram of Port A 12, which primarily contains bus switching logic to provide the FIFO with bidirectional operation using an internal unidirectional structure. Port A 12 receives data bytes $A_0$–$A_8$ on a bidirectional data bus from the sending subsystem.

Input Control 58 receives CONT EN (control enable) and DIR (direction select) signals from Control block 22. When DIR select indicates A to B, and CONT EN is inactive, data bytes $A_0$–$A_8$ will be routed through three-state buffer 60 to FIFO Input Bus 16. If CONT EN is active, buffer 60 will be disabled, and data bytes $A_0$–$A_8$ will instead be routed to Data Recirculate Block 24 and CRC Computation Block 26.

Signals CONT EN (control enable) and DIR (direction select) signals from Control block 22 are also presented to Output Control block 64, which receives the additional signal input AOE (output enable) from the sending subsystem. Output Control block 64 will enable three-state buffer 66 only when DIR is set from B to A, when AOE is active, and when CONT EN is inactive. Together the three control signals will determine whether Port A 12 will be acting as a data input or data output port.

Clock line ACLK from the sending subsystem to Clock Generator 68 is at a suitable shift-in rate or shift-out rate. The clock signal from Clock Generator 68 is routed to FIFO Input Bus 16 as signal SI (shift in), to FIFO Output Bus 20 as signal line SO (shift out), and to CRC Computation Block 26 as signal line CRC CLK.

Status Indicator Logic 70 generates a Flag output ARFD/$\overline{DAV}$ to the sending or receiving subsystem. Signal ARFD/$\overline{DAV}$ indicates the status of the first and last storage register states of FIFO Register Block 18. The signal is designated RFD (ready for data) when Port A is acting as an input or DAV (data available) when Port A is acting as an output. Signal lines to Status Indicator Logic 70 are RFD, INHIBIT RFD, DIR, and DAV. If DIR is set for A to B and RFD active, the RFD/$\overline{DAV}$ flag will be set (active high); also if DIR is set for B to A and DAV active, the RFD/DAV flag will be set (active low).

Figure 5:
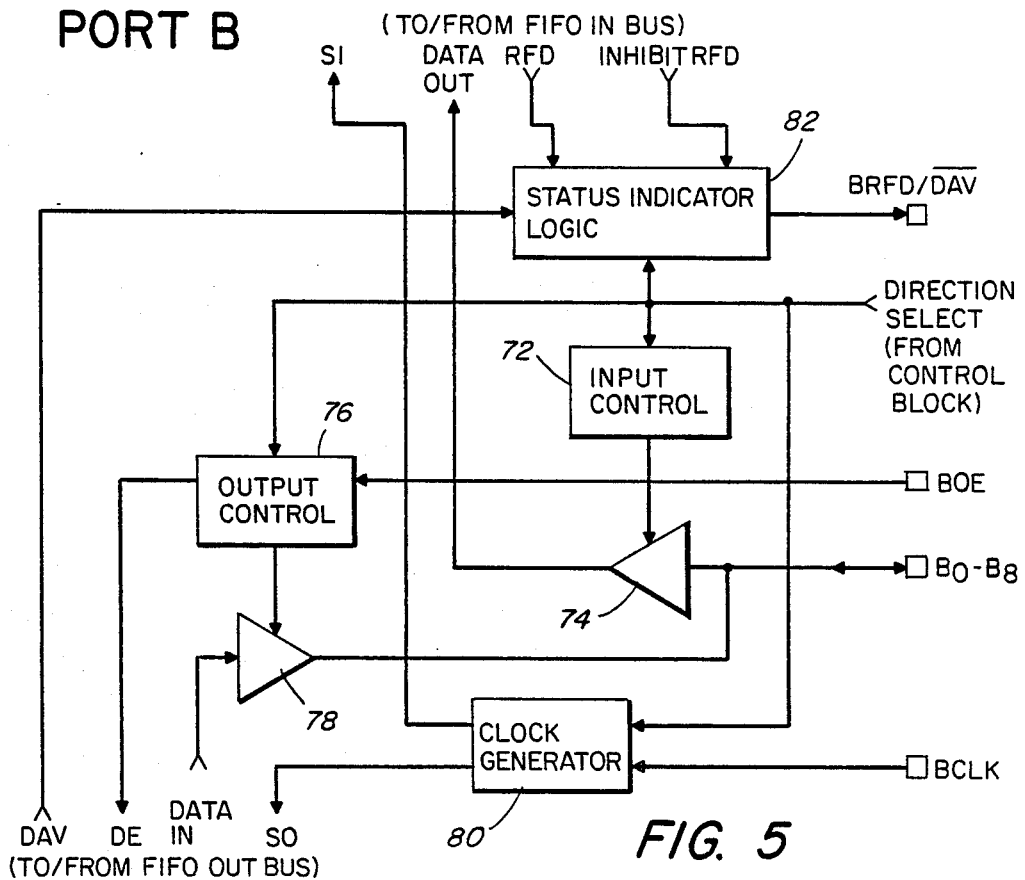
FIG. 5 is a block diagram of input/output Port B, showing further circuitry used to input and output data to the FIFO.

FIG. 5 shows a more detailed block diagram of Port B 14, which, like Port A 12, primarily contains bus switching logic to provide the FIFO with bidirectional operation using an internal unidirectional structure. Port B 14 receives data bytes $B_0$–$B_8$ on a bidirectional data bus from the sending subsystem. The structure of Port B 14 is identical and complementary to the structure of Port A with Input Control 72 to enable or disable thee-state buffer 74 to FIFO Input Bus 16. Output Control block 76 enables three-state buffer 78 only when DIR is set from A to B and when BOE is active. There is no CONT EN input in the logic of Port B 14 because the Recirculate and CRC computation functions are controlled through Port A 12 only, and this was simply a design choice. Clock line BCLK from the sending subsystem to Clock Generator 80 is at a suitable shift-in rate or shift-out rate. Status Indicator Logic 82 generates a Flag output BRFD/$\overline{DAV}$ to the sending or receiving subsystem.

Now, generally considering the operation of both Port A 12 and Port B 14, data can be entered into the FIFO whenever the RFD flag on the input port is active, by an appropriate clock transition for the the clock input of that port. Subsequently, the RFD flag will go inactive for a moment, until the data has been transferred from the first to the second of the internal FIFO register stages, and then will return to an active state. When all 265 word locations are filled with valid data, the RFD flag will remain inactive, at which time the FULL flag will go active to indicate a full condition for the device. Clock transitions on the CLK input will be ignored by the device while the RFD flag is inactive.

As soon as the first valid data have rippled through to the output of the FIFO register, the DAV flag on the output port will go active. Data can be removed by an appropriate clock transition on the CLK input for that port. This will cause the DAV flag to go inactive momentarily while the preceding data are transferred to the output register stage. When the FIFO is empty, the DAV, flag will remain inactive and the EMPTY flag will go active. Clock transitions on the CLK input will be ignored by the device while the DAV flag is inactive.

Figure 6:
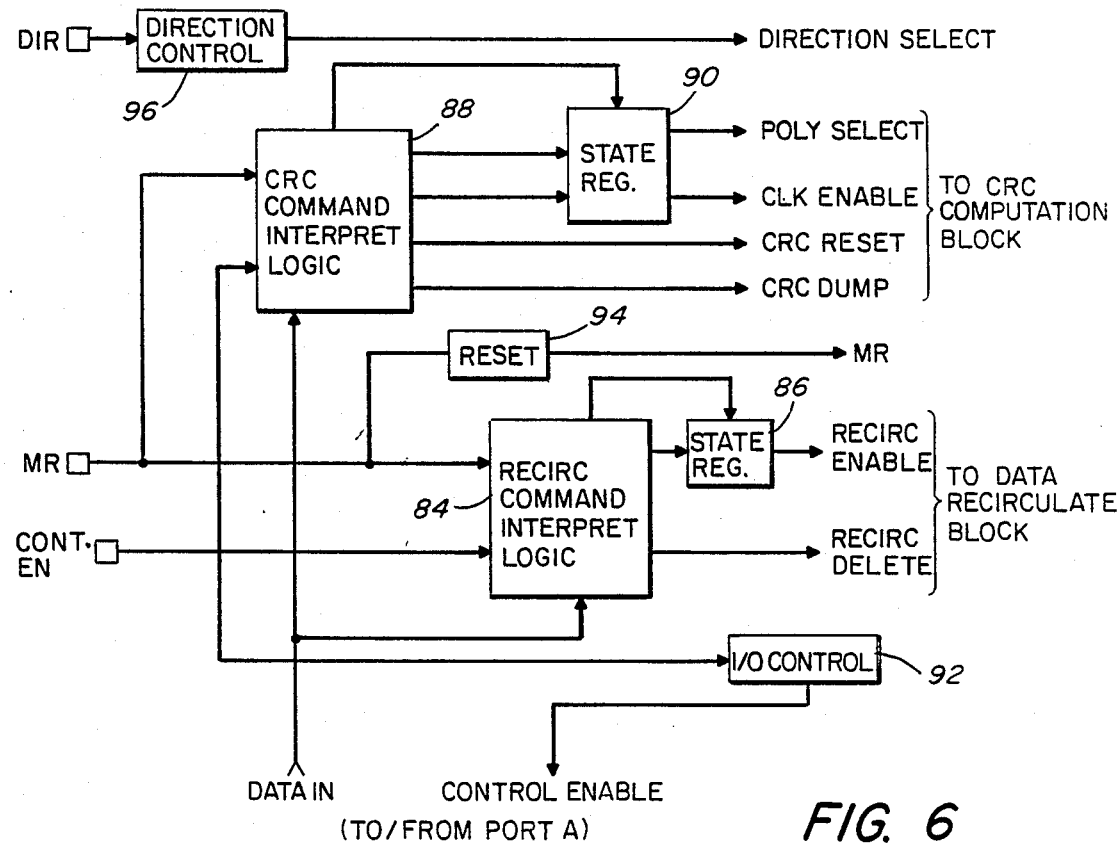
FIG. 6 is a block diagram of the Control block.

FIG. 6 illustrates in more detail the functions of control block 22. The control logic has two major sections dedicated to control of the Data Recirculate Block 24 and to the Cnc Computation block 26. Each section has logic to decode a command byte presented to Port A 12 on data Input $A_0$–$A_8$, but only when a CONT EN (control enable) signal is received. Signal CONT EN is transferred to PORT A 12 through driver 92. Command bytes originate at the Port A subsystem.

The Recirculate Command Interpret Logic 84 decodes the command byte and generates appropriate control signals for the Data Recirculation block 24. The command byte has one state-bit associated with recirculation control, which sets State Register 86, generating a recirculation enable signal. In response to a command from the Port A subsystem, the pulsed control signal RECIRC DELETE allows the last byte of data shifted out of the FIFO to be deleted from the recirculation path.

The CRC Command Interpret Logic 88 also decodes the command byte and generates appropriate control signals for Cyclic Computation block 26. There are two state bits associated with the cyclic redundancy check function in State Register 90, which define the output signals for CRC clock enable and CRC polynomial select. These two functions can be set or cleared independently by the proper command byte from the Port A subsystem. Pulsed control signals, cnc Reset and CRC dump, are output to signal lines in response to the proper command byte.

When the MR (master reset) signal is received from the Port A subsystem, all the state bits in state registers 86 and 90 are cleared to zero and three pulsed control signals are output to control lines Reset, Cnc reset, and Recirculate Delete. The master reset (MR) command, through driver 94, puts all circuitry of the FIFO into the appropriate initial state.

Signal DIR (direction select) also originates in the sending subsystem, and is routed to Port A 12 and Port B 14, through driver 96, to select the direction that data will be routed through the FIFO, either in the A to B direction or in the B to A direction. FIFO Register 18 must be empty before the direction of data transfer is changed, or else the results of the change will be unpredictable. If the FIFO register status is unknown when a direction change is to be made, a master reset (MR) pulsed should be applied to the FIFO first, in order to clear the registers.

Figure 7:
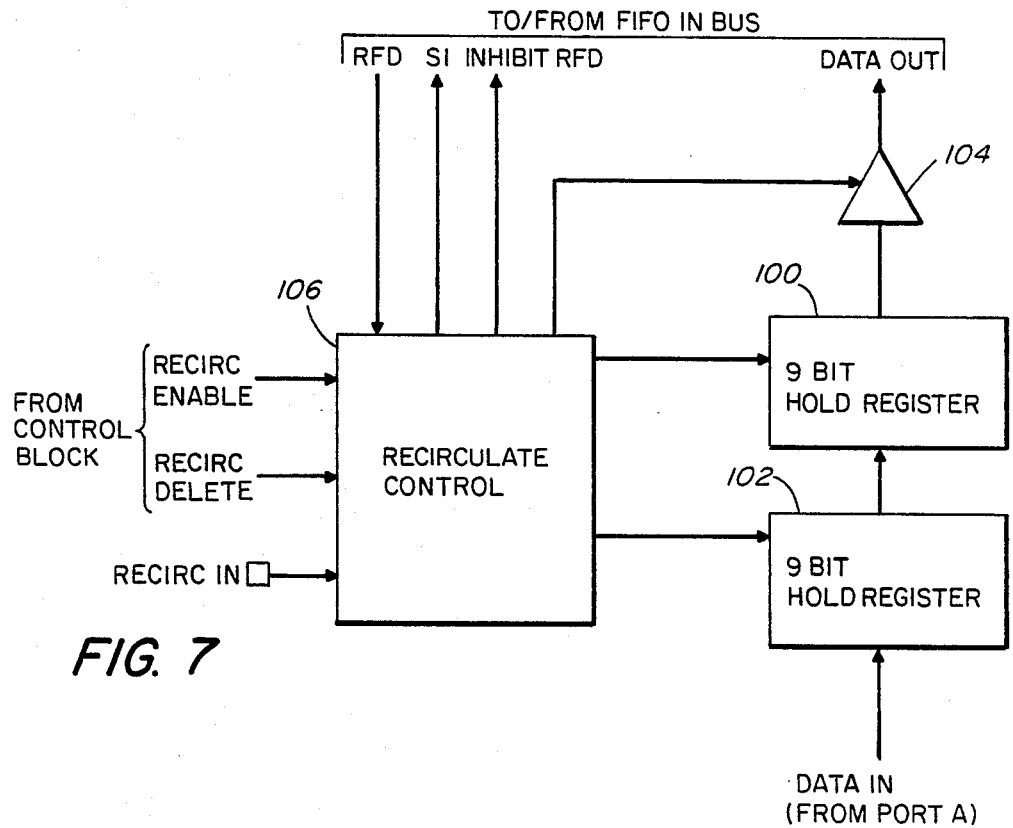
FIG. 7 is a functional block diagram of the Data Recirculate block.

Data Recirculate Block 24 is shown in more detail in FIG. 7. Data read out of the FIFO will automatically be re-entered into the FIFO, to provide the data recirculation feature. The A and B data lines must be connected together externally, and recirculation occurs only in the direction A to B, the FIFO becoming, essentially, a large shift register. Signal RECIRC IN is the recirculate clock for data being recirculated into Port A 12 data lines.

In response to a command byte and the resulting Recirculate Delete signal from Control Block 22, a data byte can be explicitly deleted to decrease the amount of data in the FIFO. But new data bytes can be entered into the FIFO, without a special command byte, to increase the amount of circulating data. The insert and delete operations can be performed for the same byte, resulting in the replacement of a data byte without affecting the total length of circulating data. If a Recirculate Enable is asserted on an active edge of the RECIRC IN clock, 9 bits of A port data will be clocked into Hold Register 102 and the old contents of Hold Register 102 will be clocked into the Hold register 100. Recirculate Control 106 marks the Hold Register 102 as full after a RECIRC IN Clock with Recirculate Enable asserted and will mark Register 102 as empty after a Recirculate Delete. If Register 102 was marked full when the RECIRC IN clock was active, then the contents of the hold Register 100 will be driven onto the FIFO Input Bus 16 via three-state buffer 104 and entered into the FIFO. During the transfer of data into the FIFO, inhibit RFD is asserted to prevent conflicts on the FIFO Input Bus.

Figure 8:
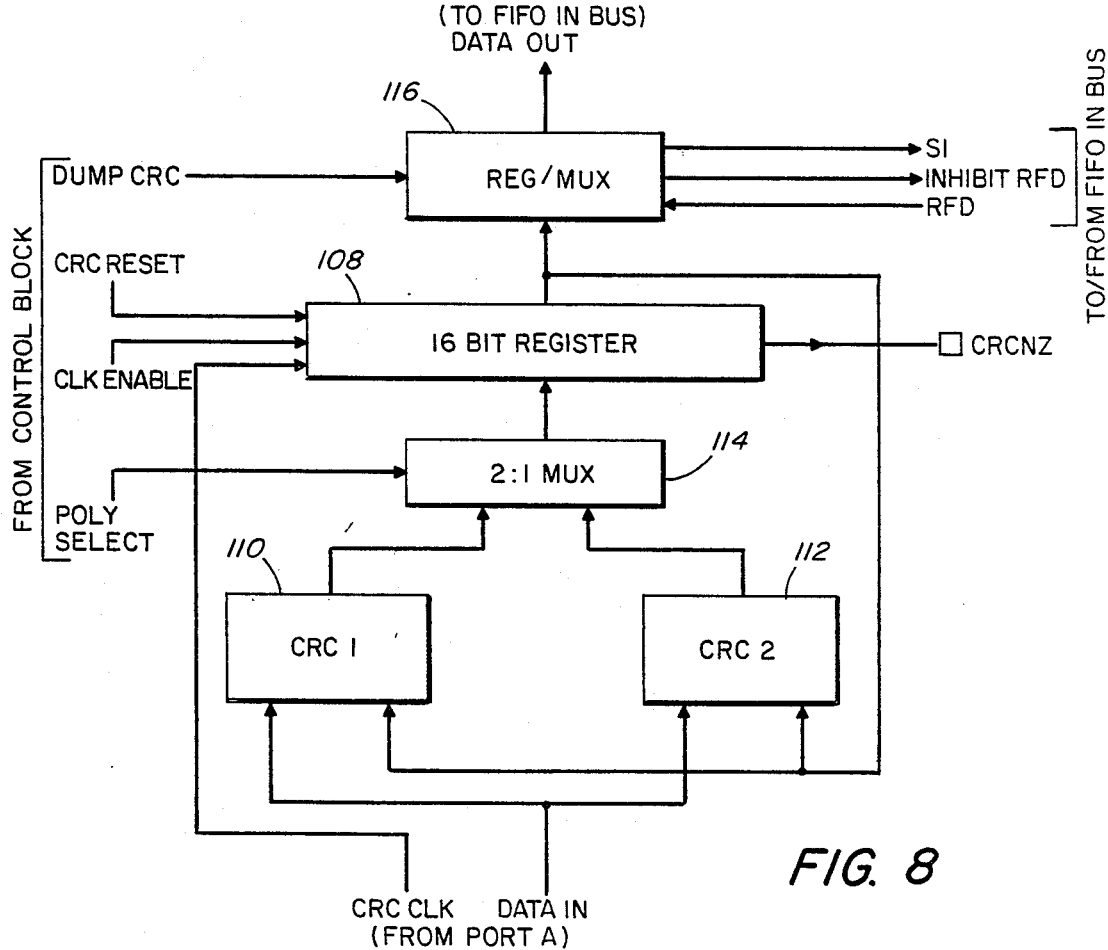
FIG. 8 is a functional block diagram of the CRC Computation block.

FIG. 8 shows the CRC Computation Block 26 in more detail. The computation of Cyclic Redundancy Check characters is provided for Port A 12 of the FIFO, and data bytes moving into or out of Port A 12 will be used for Cnc accumulation. The CRC circuitry is conventional, providing for the accumulation of a 16-bit CRC with either of two standard polynomials. The resultant CRC error output is provided either as two bytes entered into the FIFO by way of FIFO Input Bus 16 for a transmit operation, or as an error check signal on the CRCNZ (non zero) signal line.

First, the 16-bit CRC Register 108 is cleared to zero asynchronously when the CRC RESET is active. Two standard CRC polynomials are implemented in exclusive-OR logic 110 and 112, and two CRC computations are made as a function of the previous 16-bit CRC and the current 8-bit data input. Multiplexer 114 selects one of the two CRC computations via the POLY SELECT control signal. The new CRC value loads a 16-bit Register 108 with that polynomial code on the active edge of the Port A Clock input, only if the CLK ENABLE control input is active. Upon receipt of the DUMP Cnc control signal, Register/MUX 116 becomes active and performs the following actions: INHIBIT RFD is asserted to prevent any inputs from entering the FIFO until the operation is complete; the most significant byte of the CRC is entered into the FIFO via the FIFO Input Bus 18; the least significant byte of the CRC is entered into the FIFO via the FIFO Input Bus 18; and finally INHIBIT RFD is negated.

It is understood that various modifications may be made to the FIFO described without departing from the scope of the invention as claimed. For example, although NMOS or CMOS technology is preferred for implementation, other appropriate chip technologies may be used. Or, the FIFO of the present invention could be implemented using a set of chips, rather than one as described herein. Moreover, the FIFO could be made of different register lengths and widths to those hereabove, to suit the specific system requirements of a designer.

What is claimed is:

1. A first in, first out data memory comprising
a plurality of shift register sections, sequentially arranged and coupled for cascade operation, each of said sections comprising a predetermined number of shift register stages;
each section having a smaller number of stages than the one preceding it;
input means coupled to each section for writing data thereto;
output means coupled to the last of said sections for reading date from said data memory;
means for shifting data written to any one of said stages sequentially through the stages to the last of the stages which does not presently contain data; and means for selectively writing data directly into the section nearest the output means which is not presently full of data for the purpose of decreasing fall-through delay time.

2. A first in, first out data memory comprising a plurality of shift register sections, sequentially arranged and coupled for cascade operation, each of said sections comprising a predetermined number of shift register stages;

each section having a small number of register stages than the one preceding it;

input means coupled to each section for writing data thereto;

a bypass bus, selectively coupled to the input means of each section, through which data is introduced;

output means, coupled to the last of said sections, for reading data from said data memory;

first status means, associated with each of said register stages, for indicating an empty data condition for that stage and a full data condition for the preceding register stage;

first control logic means, associated with each of said register stages and responsive to said first status means, to advance said data from the preceding register stage to the present register stage;

second status means, coupled to each of said sections, for indicating either a full or not full data condition for that section; and second control logic means, coupled to each of said sections and responsive to said second status means, for selecting which of said sections is to receive data from said bypass bus;

whereby data input to said data memory is always written into the section nearest the output means which presently indicates a not full data condition for the purpose of decreasing fall-through delay time.

3. A first in, first out data memory as claimed in claim 2, further including first clock input means, coupled to said bypass bus, for controlling the rate at which data is introduced onto said bypass bus; and second clock input means, coupled to said output means, for controlling the rate at which data is read from said data memory.

4. A first in, first out data memory as claimed in claim 2, wherein the number of register stages in the last of said sections is governed by the relationship $$N_1 = T_{fallthru}/T_{drip}$$

and the number of register stages in preceding sections is governed by the relationship $$N_j = (N_1 + \ldots N_{(j-1)}) \times (T_{shift} - T_{bubble} - T_{drip})/T_{drip}$$

to optimize said register section lengths so that a continuous input data stream will not have time delay gaps introduced therein upon reading said output means;

where Tfallthru is the desired fall-through delay for the FIFO, Tdrip is the time for a datum to move form one register stage to the next consecutive stage, Tshift is the required input or output time, and Tbubble is the time for a data vacancy to move from one register stage to the full stage preceding it.

5. A first in, first out data memory as claimed in claim 2, wherein said memory is constructed as a solid-state integrated circuit.

6. A programmable first in, first out data memory comprising a first bidirectional port for transferring data into or out of said data memory;

a second bidirectional port for transferring data into or out of said data memory;

control means, coupled to the first and second directional ports, for selecting the direction of data transfer through the ports;

a register block including a plurality of shift register sections coupled for cascade operation, an input, and an output, such that data introduced at the input of the register block is shifted sequentially through the shift register sections to the output;

each of said sections comprising a predetermined number of shift register stages;

each section having a smaller number of register stages than the one preceding it;

an input bus for transferring data from the first or second bidirectional port to the input of said register block; and an output bus for transferring data from the output of the register block to the first or second bidirectional port.

7. A programmable first in, first out data memory as recited in claim 6, further comprising means for selectively writing data directly into the section nearest the output means which is not presently full of data for the purpose of decreasing fall-through delay time.

8. A first in, first out data memory circuit, as recited in claim 6, further including data error detection means coupled to at least one port.

9. A first in, first out data memory circuit, as recited in claim 6, further including data recirculating means coupled to at least one port.

10. A first in, first out data memory circuit as recited in claim 6, wherein said memory is constructed as a solid-state integrated circuit.

* * * * *